United States Patent [19]

Jin

[11] 3,943,113

[45] Mar. 9, 1976

[54] POLYMER COMPOSITION OF A VINYL COMPOUND, A BIS (HYDROCARBYL)VINYLPHOSPHONATE AND AN ALLYL HALIDE

[75] Inventor: Jung Il Jin, Irvington, N.Y.

[73] Assignee: Stauffer Chemical Company, Westport, Conn.

[22] Filed: Aug. 9, 1974

[21] Appl. No.: 496,234

[52] U.S. Cl. ............ 260/80.71; 260/890; 260/891
[51] Int. Cl.$^2$ ...................................... C08F 230/00
[58] Field of Search .................................. 260/80.71

[56] References Cited
UNITED STATES PATENTS

| | | | |
|---|---|---|---|
| 3,489,706 | 1/1970 | Mikofalvy | 260/80.71 X |
| 3,725,509 | 4/1973 | Kraft et al. | 260/80.71 X |
| 3,792,113 | 2/1974 | Goswami et al. | 260/867 UN |
| 3,819,770 | 6/1974 | Kraft et al. | 260/80.71 |

*Primary Examiner*—Joseph L. Schofer
*Assistant Examiner*—Herbert J. Lilling
*Attorney, Agent, or Firm*—Richard P. Fennelly

[57] ABSTRACT

Polymer compositions formed by polymerizing a vinyl compound, e.g., a vinyl halide, a bis(hydrocarbyl)-vinylphosphonate e.g., bis(beta-chloroethyl)vinylphosphonate, and an allyl halide, e.g., allyl chloride, find use as flame retardant plasticizers when the amount of allyl halide ranges between about 20% and 50% by weight and can be used as flame retardant solid additives when the amount of allyl halide ranges between about 5 and 20% by weight of the composition.

14 Claims, No Drawings

POLYMER COMPOSITION OF A VINYL COMPOUND, A BIS (HYDROCARBYL)VINYLPHOSPHONATE AND AN ALLYL HALIDE

TECHNICAL DISCLOSURE OF THE INVENTION

The present invention relates to copolymers which have flame ratardant properties and which, can be, as will be described in greater detail below, prepared by conventional bulk, suspension and emulsion polymerization procedures. They are useful as additives in a wide number of plastic materials.

The first component of the monomer mixture used in polymerizing the polymer composition of this invention is at least one alpha, beta-ethylenically unsaturated or vinyl monomer. Typical monomers include the vinyl halides such, for example, as vinyl chloride, vinyl fluoride and vinyl bromide; halogenated $C_1$–$C_{12}$ alkyl acrylates and methacrylates such as, for example, methyl alpha-chloroacrylate and methyl alpha-bromoacrylate; the vinylidene halides such as, for example, vinylidene chloride, vinylidene bromide, vinylidene chlorobromide and vinylidene fluoride; halo-substituted nitriles of ethylenically unsaturated carboxylic acids such as, for example, alpha-chloroacrylonitrile; and the chlorinated styrenes such as, for example, alpha-chlorostyrene, o-chlorostyrene, m-chlorostyrene, p-chlorostyrene 2,4-dichlorostyrene.

The amount of the vinyl monomer which is used is about 10% to 80% by weight of the monomer mixture and of the corresponding copolymer produced therefrom. Mixtures can be used. For example a mixture of vinyl chloride and vinyl bromide in a weight ratio of 1:10 to 10:1 can be utilized.

The second component of the monomer mixture is at least one bis(hydrocarbyl)vinylphosphonate having the structure:

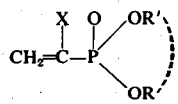

wherein X is selected from the group consisting of hydrogen, halogen, cyano, aryl, $C_1$–$C_{18}$ alkyl and

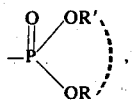

wherein R and R' are hydrocarbyl and substituted hydrocarbyl groups consisting essentially of hydrogen and carbon and containing up to 18 carbon atoms inclusive with the proviso that R and R' may be the same, different or conjoint, i.e., R and R' may form one single radical.

The use, in this disclosure, of the expression "hydrocarbyl" and "substituted hydrocarbyl groups" refers to the radicals obtained upon the removal of a hydrogen from a hydrocarbon or substituted hydrocarbon group which may be either an aliphatic or aromatic group. These hydrocarbyl groups may be substituted with any non-interfering groups, i.e., with any groups which do not interfere with the polymerization of the bis-(hydrocarbyl)vinylphosphonate. Such substituent groups include, for example, chloro, bromo, fluoro, nitro, hydroxy, sulfone, ethoxy, methoxy, nitrile, ether, ester and keto groups and the like.

Illustrative of such aliphatic groups as are represented by R and R' are alkyl groups, such as methyl, ethyl, propyl, butyl, pentyl, nonyl, pentenyl, and hexenyl groups and all of their respective isomers; cycloalkyl groups, such as cyclopropyl, cyclobutyl, cyclopentyl, cyclohexyl and cyclohexenyl groups and the like; while typical aryl groups represented by R and R' include phenyl, benzyl, phenethyl, tolyl and naphthyl groups and the like.

Representative of the above depicted bis(hydrocarbyl) vinylphosphonates are:
Bis(beta-chloroethyl) vinylphosphonate;
Bis(beta-chloropropyl) vinylphosphonate;
Bis(beta-chloroethyl) 1-methylvinylphosphonate;
Bis(beta-chloroethyl) 1-cyanovinylphosphonate;
Bis(beta-chloroethyl) 1-phenylvinylphosphonate;
Dimethyl vinylphosphonate;
Diethyl vinylphosphonate;
Bis(omega-chlorobutyl) vinylphosphonate;
Di-n-butyl vinylphosphonate;
Di-isobutyl vinylphosphonate;
Bis(2-chloroisopropyl) 1-methylvinylphosphonate;
Diphenyl vinylphosphonate; and
Bis(2,3-dibromopropyl) vinylphosphonate.

From the above group of bis(hydrocarbyl) vinylphosphonate monomers, it is preferred to employ bis(beta-chloroethyl) vinylphosphonate in preparing the novel aqueous emulsion copolymers of this invention since the latter monomer is a commercially available material and is lower in cost than any of the other bis(hydrocarbyl) vinylphosphonates. For the same reasons, it is preferred to employ vinyl chloride as the halogen containing ethylenically unsaturated monomer in these aqueous emulsion copolymers. It is to be noted, at this point, that the use of the term "copolymer" in this disclosure is meant to apply to polymers derived from two, three or more distinct monomer species. The amount of vinylphosphonate in the monomer mixture and in the resulting copolymer ranges between about 2% and 80% by weight of the mixture or copolymer.

The third component of the copolymer of the present invention is an allyl halide, preferably allyl chloride or allyl bromide. If desired the component can be a mixture of allyl chloride and allyl bromide in a weight ratio of about 1:10 to 10:1. This allyl halide is present in an amount ranging from about 5–50% by weight of the copolymer and the monomer mixture from which it is formed. When the amount ranges between about 5–20% the copolymer can be added to a wide variety of plastics to confer flame retardancy thereon. If the amount of allyl chloride ranges from 20% to about 50% the copolymer has both plasticizing action as well as flame retardancy characteristics.

When the amount of allyl chloride is above about 20% the monomers are preferably subjected to conventional bulk polymerization procedures using from about 0.1% to 3% of a monomer soluble catalyst at temperatures of about 40°C. to about 100°C. If desired, the polymerization medium can also contain a suitable organic solvent.

Suspension or emulsion polymerization procedures conventionally known in the art are preferably used when the amount of allyl halide is between about 5% and 20% by weight. The suspension batch charge will contain about 0.05% to 5%, based on the weight of monomer mixture, of a suspending agent, e.g., methyl cellulose, hydroxyethyl cellulose, hydroxypropyl methyl cellulose, and gelatin, and about 0.01% to 3.0%, by weight of the monomer mixture, of a monomer-soluble initiator, e.g., azobisisobutyronitrile, lauroyl peroxide, benzoyl peroxide or isopropylperoxy dicarbonate. The polymerization is conducted at 35°–100°C. with agitation for 2–12 hours. When emulsion polymerization is selected the emulsifying agent, e.g. sodium lauryl sulfate, potassium stearate, an alkyl benzene sulfonate, ammonium dialkyl sulfosuccinate, etc., is usually present at about 0.2% to 3% by weight of the monomer mixture and about 0.1% to 3.0% of a water soluble persulfate, perborate, or peroxide catalyst is used. The polymerization is conducted generally at about 25°–70°C.

The copolymer of the present invention can be added to a wide variety of normally flammable thermoplastic substrates in an amount ranging between about 5% to 100% by weight of the substrate to confer flame retardancy thereon. When the amount of allyl halide is above about 20% the copolymers have plasticizer properties as well. Examples of suitable flammable substrates to which the copolymer might be added are polyvinyl chloride homopolymers and copolymers, the methyl methacrylates, styrenes, acrylics, acrylonitrile-butadiene-styrene resins, butadiene-acrylonitrile copolymers, and polyacrylonitrile substrates.

EXAMPLE 1

A mixture of 30 g of vinyl chloride, 45 g of bis(beta-chloroethyl) vinyl phosphonate and 25 g of allyl chloride was polymerized in bulk with constant agitation for 5 hours at 60°C. followed by 12 more hours polymerization at 75°C. Benzoyl peroxide (2 g) was used as an initiator. A very viscous fluid was obtained.

EXAMPLE 2

A mixture of 40 g of vinyl chloride, 40 g of bis(beta-chloroethyl) vinylphosphonate and 20 g of allyl chloride was polymerized in 150 g of tricresylphosphate for 5 hours at 60°C. followed by 12 hours of polymerization at 75°C. Benzoyl peroxide (2 g) was used as an initiator. An easy flowing fluid was obtained in almost quantitative yield.

EXAMPLE 3

A mixture of 40 g of bis(beta-chloroethyl) vinyl phosphonate, 40 g of vinyl acetate and 20 g of allyl chloride was polymerized in bulk under the same reaction conditions described in Example 1. A sticky thick taffy-like material was obtained.

EXAMPLE 4

A mixture of 30 g of bis(beta-chloroethyl) vinyl phosphonate, 20 g of allyl chloride and 30 g of vinyl acetate was polymerized in 100 g of tricresyl phosphate following the procedure described in Example 2. A fluid clear polymer solution was obtained.

EXAMPLE 5

A mixture of 80 g of bis(beta-chloroethyl) vinyl phosphonate, 30 g of allyl chloride and 40 g of vinyl chloride was polymerized in bulk following the procedure described in Examples 1 and 3. A tacky, soft, semisolid polymer was obtained.

EXAMPLE 6

Flexible polyvinyl chloride (PVC) films are made having the following composition and their fire retardant properties are compared:

| FILM NO. | PVC | DIOCTYLPHTHALATE | COPOLYMER OF EXAMPLE 2 | FLAMMABILITY |
|---|---|---|---|---|
| 1 | 100 g | 80 g | 0 | B* |
| 2 | 100 g | 40 g | 40 g | SE* |

*B = burns when ignited with a match.
SE = self-extinguishes after ignition as soon as match is removed.

EXAMPLES 7–8

The following reagents were charged into a polymerization reactor:

| REAGENTS | A AMOUNT | B (Grams) |
|---|---|---|
| Vinyl chloride monomer | 70 | 70 |
| Bis(beta-chloroethyl) vinylphosphonate | 30 | 30 |
| Allyl chloride | 5 | 10 |
| Alpha, alpha-azobis 2,4-dimethylvaleronitrile (Vazo 52) | 0.5 | 0.6 |
| Methyl cellulose suspending agent-1% solution | 50 | 50 |
| Distilled water | 250 | 250 |

Suspension polymerization was conducted for 12 hours at 55°C. under agitation. The yield for batches A and B was 93 and 96 grams and the relative viscosities were 1.45 and 1.32 in 1% cyclohexanone at 25°C., and 3 grams of B completely dissolved in 7g of methyl methacrylate while 3 g. of A partially dissolved.

EXAMPLE 9

When 3.5 g of the copolymer of Example 8 was dissolved in 6.5 g of methyl methacrylate monomer, the resulting mixture was fluid. This mixture was polymerized to a hard clear cast using 0.2 g of benzoyl peroxide at about 60°–80°C. This cast could not be ignited with a Bunsen burner and had an LOI (limiting oxygen index) of 23.5.

What is claimed:

1. A copolymer having flame retardant properties which consists essentially of:
   a. about 10 to 80% by weight of an alpha, beta-ethylenically unsaturated vinyl monomer selected from the group consisting of vinyl chloride, vinyl bromide, and vinyl acetate;
   b. about 2 to 80% by weight of a bis(hydrocarbyl) vinylphosphonate having the structure

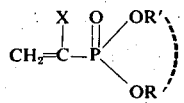

wherein X is selected from the group consisting of hydrogen, halogen, cyano, aryl, $C_1$–$C_{18}$ alkyl and

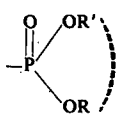

wherein R and R' are hydrocarbyl and hydrocarbyl groups containing non-interfering substituents consisting essentially of hydrogen and carbon and containing up to 18 carbon atoms; and c. about 5% to 50% by weight of an allyl halide selected from the group consisting of allyl chloride and allyl bromide.

2. A copolymer as claimed in claim 1 wherein the alpha, beta ethylenically unsaturated monomer is vinyl chloride.

3. A copolymer as claimed in claim 1 wherein the alpha, beta ethylenically unsaturated monomer is vinyl acetate.

4. A copolymer as claimed in claim 1 wherein the vinylphosphonate is bis(beta-chloroethyl) vinylphosphonate.

5. A copolymer as claimed in claim 1 wherein the allyl halide is allyl chloride.

6. A copolymer as claimed in claim 1 comprising about 10% to 80% by weight vinyl chloride, about 2% to 80% by weight bis(beta-chloroethyl) vinylphosphonate, and about 2% to 50% by weight allyl halide.

7. A copolymer as claimed in claim 1 comprising about 10% to 80% by weight vinyl acetate, about 2% to 80% by weight bis(beta-chloroethyl) vinylphosphonate, and about 2% to 50% by weight allyl halide.

8. A copolymer as claimed in claim 1 wherein the alpha, beta ethylenically unsaturated monomer is vinyl bromide.

9. A copolymer as claimed in claim 1 wherein the alpha, beta ethylenically unsaturated monomer component comprises a mixture of vinyl chloride and vinyl bromide in a weight ratio of about 1:10 to 10:1.

10. A copolymer as claimed in claim 1 wherein the allyl halide is allyl bromide.

11. A copolymer as claimed in claim 1 wherein the allyl halide is a mixture of allyl chloride and allyl bromide in a weight ratio of about 1:10 to 10:1.

12. A copolymer as claimed in claim 7 wherein the allyl halide is allyl chloride.

13. A copolymer as claimed in claim 7 wherein the allyl halide is allyl bromide.

14. A copolymer as claimed in claim 7 wherein the allyl halide component comprises a mixture of allyl chloride and allyl bromide in a weight ratio of about 1:10 to 10:1.

* * * * *

UNITED STATES PATENT AND TRADEMARK OFFICE
CERTIFICATE OF CORRECTION

PATENT NO. : 3,943,113
DATED : March 9, 1976
INVENTOR(S) : Jung Il Jin

It is certified that error appears in the above-identified patent and that said Letters Patent are hereby corrected as shown below:

Col. 1, lines 39-45, the structural formula should read:

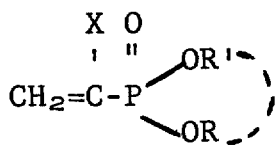

Signed and Sealed this

Twelfth Day of October 1976

[SEAL]

Attest:

RUTH C. MASON
Attesting Officer

C. MARSHALL DANN
Commissioner of Patents and Trademarks